United States Patent
Wang et al.

(10) Patent No.: US 11,775,511 B2
(45) Date of Patent: Oct. 3, 2023

(54) FEEDBACK-UPDATED DATA RETRIEVAL CHATBOT

(71) Applicant: International Business Machines Corporation, Armonk, NY (US)

(72) Inventors: Wen Wang, Beijing (CN); Yi Chen Zhong, Shanghai (CN); Yi Ming Wang, Xian (CN); Lu Yu, Wuhu (CN); Liu Yao He, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 17/444,382

(22) Filed: Aug. 3, 2021

(65) Prior Publication Data

US 2023/0041181 A1 Feb. 9, 2023

(51) Int. Cl.
*G06F 7/00* (2006.01)
*G06F 16/242* (2019.01)
*G06N 20/00* (2019.01)
*G06F 16/2455* (2019.01)

(52) U.S. Cl.
CPC ........ *G06F 16/243* (2019.01); *G06F 16/2455* (2019.01); *G06N 20/00* (2019.01)

(58) Field of Classification Search
CPC ............. G06F 16/243; G06F 16/90332; G06F 16/2425; G06F 16/2453; G06F 16/3344; G06F 16/338; G06F 16/334; G06F 40/35; G06F 40/211; G06F 40/295; G06N 20/00
See application file for complete search history.

(56) References Cited

U.S. PATENT DOCUMENTS

| | | | |
|---|---|---|---|
| 7,620,542 B2 | 11/2009 | Sheu | |
| 7,725,307 B2 | 5/2010 | Bennett | |
| 10,318,586 B1 * | 6/2019 | Rose | ..................... G06F 16/285 |

(Continued)

FOREIGN PATENT DOCUMENTS

CN 107885874 A 4/2018

OTHER PUBLICATIONS

"How to insert and query a database with a chatbot", ChatCompose, last printed Jul. 29, 2021, 4 pages, <https://www.chatcompose.com/insert-query-database.html>.

(Continued)

*Primary Examiner* — Mohammad A Sana
(74) *Attorney, Agent, or Firm* — Michael A. Petrocelli

(57) ABSTRACT

A computer retrieves data from a database. The computer retrieves a Machine Learning (ML) model trained to generate database queries. The computer applies the ML model to generate a primary database query based, at least in part, on a user inquiry available to the computer. The computer retrieves the primary database query, an initial set of data from a database available to the computer. The computer, in response to retrieving the initial set of data, receives feedback assessing the initial set of data. The computer, in response to receiving the feedback, applies a Natural Language Processing (NLP) model to identify query adjustment content within the feedback. The computer revises the primary database query based, at least in part, on the model adjustment content, to generate a secondary database query. The computer retrieves using the secondary database query, a secondary set of data from the database.

20 Claims, 8 Drawing Sheets

(56) References Cited

U.S. PATENT DOCUMENTS

| | | | |
|---|---|---|---|
| 11,138,473 B1* | 10/2021 | Padmanabhan | G06K 9/6227 |
| 11,301,502 B1* | 4/2022 | Dijamco | G06F 40/35 |
| 2005/0043940 A1 | 2/2005 | Elder | |
| 2018/0032576 A1 | 2/2018 | Romero | |
| 2021/0064932 A1 | 3/2021 | Wang | |
| 2021/0149886 A1* | 5/2021 | Zheng | G06F 16/243 |
| 2022/0309106 A1* | 9/2022 | Ramos | G06F 16/90332 |

OTHER PUBLICATIONS

Biswas, Debmalya, "Self-improving Chatbots based on Deep Reinforcement Learning", Medium, Towards Data Science, Sep. 14, 2020, 9 pages, <https://towardsdatascience.com/self-improving-chatbots-based-on-reinforcement-learning-75cca62debce>.

Canh, Nguyen Trong, "Turn your database into a chatbot", medium.com, botfuel, May 4, 2018, 4 pages, <https://medium.com/botfuel/turn-your-database-into-a-chatbot-10dae003b97d>.

Godwami, Ricky, "Chatbots that connect to SQL Database—New Feature Launch—Chatbots using simple spreadsheets, with Human Agent Takeover", Hybrid.Chat, blog, last printed Jul. 29, 2021, 4 pages, <https://hybrid.chat/blog/chatbots-that-connect-to-sql-database-new-feature-launch/>.

Hancock, et al., "Learning from Dialogue after Deployment: Feed Yourself, Chatbot!", feedarXiv:1901.05415v4, Jun. 13, 2019, 18 pages, <https://arxiv.org/pdf/1901.05415.pdf>.

Mell, et al., "The NIST Definition of Cloud Computing", National Institute of Standards and Technology, Special Publication 800-145, Sep. 2011, 7 pages.

Simud, et al., ":A Conversational Agent for Database Query: A Use Case for Thai People Map and Analytics Platform", 2020 15th International Joint Symposium on Artificial Intelligence and Natural Language Processing (iSAI-NLP), 6 pages, <https://ieeexplore.ieee.org/document/9376833>.

* cited by examiner

| User ID | User Inquiry |
|---|---|
| 1 | What low-rated bonds issued this week with a yield higher than 5 percent? |

| Model-Identified Data Attributes to Retrieve (e.g., initial information to obtain for qualified data samples) |
|---|
| Bond ID |
| Bond name |
| Yield |
| Rating |
| Bond Type |

| Model Identified Filter Criteria (e.g., initially targeted attribute ranges) |
|---|
| Yield > 5% |
| Issue date = current week |

| Results Of Primary Query (e.g., initial set of data) |||||
|---|---|---|---|---|
| Bond ID | Bond name | Yield | Rating | Bond Type |
| ID 1 | Name 1 | 10% | A | Type 1 |
| ID 2 | Name 2 | 6% | B | Type 1 |
| ID 3 | Name 3 | 7% | C | Type 2 |

| Relevant Users | Feedback Assessing Results Of Primary Query (e.g., initial set of data) |
|---|---|
| 1 | Include relevant sample issue date |
| All | Low-rating means rated lower than "B" |

FIG. 5A

| Revised Data Sample Attributes to Retrieve (e.g., adjusted information to obtain for qualified data samples) |
|---|
| Bond ID |
| Bond name |
| Yield |
| Rating |
| Bond Type |
| Issue Date |

FIG. 5B

| Revised Filtering Criteria Attributes |
|---|
| Yield > 5% |
| Issue date = current week |
| Rating < B |

FIG. 5C

| Results of Secondary Query (e.g., secondary set of data) |||||| 
|---|---|---|---|---|---|
| Bond ID | Bond name | Yield | Rating | Bond Type | Issue date |
| ID 3 | Name 3 | 7% | C | Type 2 | Date 3 |

FIG. 5D

FEEDBACK-UPDATED DATA RETRIEVAL CHATBOT

BACKGROUND

The present invention relates generally to the field of computer-assisted data retrieval, and more specifically, to chatbot agents that respond to requests for information.

Computer-assisted interface agents (e.g., "chatbots") interact with and provide information to users in a variety of settings. In some use cases, a chatbot interacts with end users to provide responses to user inquiries. In many settings, chatbots use Natural Language Processing (NLP) or similar Machine Learning (ML) models to generate queries based on search criteria identified within user-posed questions. In some cases, the ML model behavior is guided by domain-specific training data that allows the models to recognize terms having specialized meanings within the associated domain.

SUMMARY

In embodiments according to the present invention, a computer implemented method of retrieving data from a database, includes receiving, by a computer, a Machine Learning (ML) model trained to generate database queries. The computer applies the ML model to generate a primary database query based, at least in part, on a user inquiry available to the computer. The computer retrieves the primary database query, an initial set of data from a database available to the computer. The computer, in response to retrieving the initial set of data, receives feedback assessing the initial set of data. The computer, in response to receiving the feedback, applies a Natural Language Processing (NLP) model to identify query adjustment content within the feedback. The computer revises the primary database query based, at least in part, on the model adjustment content, to generate a secondary database query. The computer retrieves using the secondary database query, a secondary set of data from the database. According to aspects of the invention, the computer generates training data based, at least in part, on the secondary query and the user inquiry and retrains the ML model with the training data to generate an adjusted ML model that reflects, at least partially, the query adjustment content. According to aspects of the invention, the computer recognizes that at least a portion of the feedback is associated with a selected user, and assigns the adjusted ML model to the selected user. According to aspects of the invention, the model adjustment content includes at least one database query language expression. According to aspects of the invention, the model adjustment content is identified, at least in part, by a binary intent classification algorithm. According to aspects of the invention, the model adjustment content is identified, at least in part, by a multi category classification algorithm. According to aspects of the invention, the model adjustment content is identified, at least in part, by an entity extraction algorithm.

In another embodiment of the invention, a system of retrieving data from a database includes a computer system comprising a computer readable storage medium having program instructions embodied therewith, the program instructions executable by a computer to cause the computer to receive a Machine Learning (ML) model trained to generate database queries; apply the ML model to generate a primary database query based, at least in part, on a user inquiry available to the computer; retrieve using the primary database query, an initial set of data from a database available to the computer; responsive to retrieving the initial set of data, receive feedback assessing the initial set of data; responsive to receiving the feedback, apply a Natural Language Processing (NLP) model to identify query adjustment content within the feedback; revise the primary database query based, at least in part, on the model adjustment content, to generate a secondary database query; and retrieve using the secondary database query, a secondary set of data from the database.

In another embodiment of the invention, a computer program product to retrieve data from a database includes a computer readable storage medium having program instructions embodied therewith, the program instructions executable by a computer to cause the computer to: receive, using a computer, a Machine Learning (ML) model trained to generate database queries; apply, using the computer, the ML model to generate a primary database query based, at least in part, on a user inquiry available to the computer; retrieve, using the computer, using the primary database query, an initial set of data from a database available to the computer; responsive, using the computer, to retrieving the initial set of data, receive feedback assessing the initial set of data; responsive, using the computer, to receiving the feedback, apply a Natural Language Processing (NLP) model to identify query adjustment content within the feedback; revise, using the computer, the primary database query based, at least in part, on the model adjustment content, to generate a secondary database query; and retrieve, using the computer, using the secondary database query, a secondary set of data from the database.

The present disclosure recognizes and addresses the shortcomings and problems associated with using chatbots trained with training data insufficient to address domain-specific inquiries.

The present disclosure recognizes and addresses the shortcomings and problems associated with using chatbots trained with outdated training data.

Aspects of the present invention address difficulties associated with generating structured language queries in domains characterized by rapidly changing technology.

Aspects of the present invention address difficulties associated with generating structured language queries in domains characterized by specialized, non-uniform technology.

Aspects of the invention interactively adjust real-time chatbot performance and responses based on user feedback.

Aspects of the invention adjust machine language models with training data updated to represent queries modified in accordance with user feedback.

Aspects of the invention provide real-time correction to chatbot responses based, at least partially, to user feedback provided to the chatbot.

Aspects of the invention update NLP models based on customized, user-specific performance assessment feedback.

Aspects of the invention update NLP models based on generic, system-wide performance assessment feedback.

Aspects of the invention allow users to give detailed, interactive feedback regarding chatbot performance and results provided.

Aspects of the invention process ongoing user conversations to identify database query adjustment elements within user feedback, dynamically incorporating the adjustment elements to update queries and provide results adjusted in real-time.

Aspects of the invention update query-generating models based on chatbot queries adjusted to accommodate user feedback.

Aspects of the invention recognize and address outdated NLP models (or similar machine learning models) trained with outdated training data.

Aspects of the invention guide end users to give detailed output assessment feedback with a dialogue mechanism (e.g., a user interface).

Aspects of the invention iteratively collect feedback from multiple user interactions, mine database elements, combine feedback with previous understanding to update queries, and give real-time output correction based on the information collected during the feedback interaction.

Aspects of the invention collect modifications made in response to user feedback and update query generating models (e.g., backend ML models) accordingly.

Aspects of the invention recognize and address the difficulty of accommodating some user feedback that is associated with only selected users, as well as generic feedback.

Aspects of the invention iteratively accommodate multiple sets of training data to be used for ML models, with some training data sets reflecting user-specific model changes and some training data sets reflecting generic model changes.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 4A is a table showing aspects of a user inquiry provided for use with the database chatbot assistant system shown in FIG. 1.

FIG. 4B is a table showing aspects of a primary query relevant to the database chatbot assistant system shown in FIG. 1.

FIG. 4C is a table showing aspects of a primary query relevant to the database chatbot assistant system shown in FIG. 1.

FIG. 4D is a table showing results of a primary query relevant to the database chatbot assistant system shown in FIG. 1.

FIG. 5A is a table showing aspects of a user feedback provided for use with 3 the database chatbot assistant system shown in FIG. 1.

FIG. 5B is a table showing aspects of a revised query relevant to the database chatbot assistant system shown in FIG. 1.

FIG. 5C is a table showing aspects of a revised query relevant to the database chatbot assistant system shown in FIG. 1.

FIG. 5D is a table showing results of a secondary query relevant to the database chatbot assistant system shown in FIG. 1.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
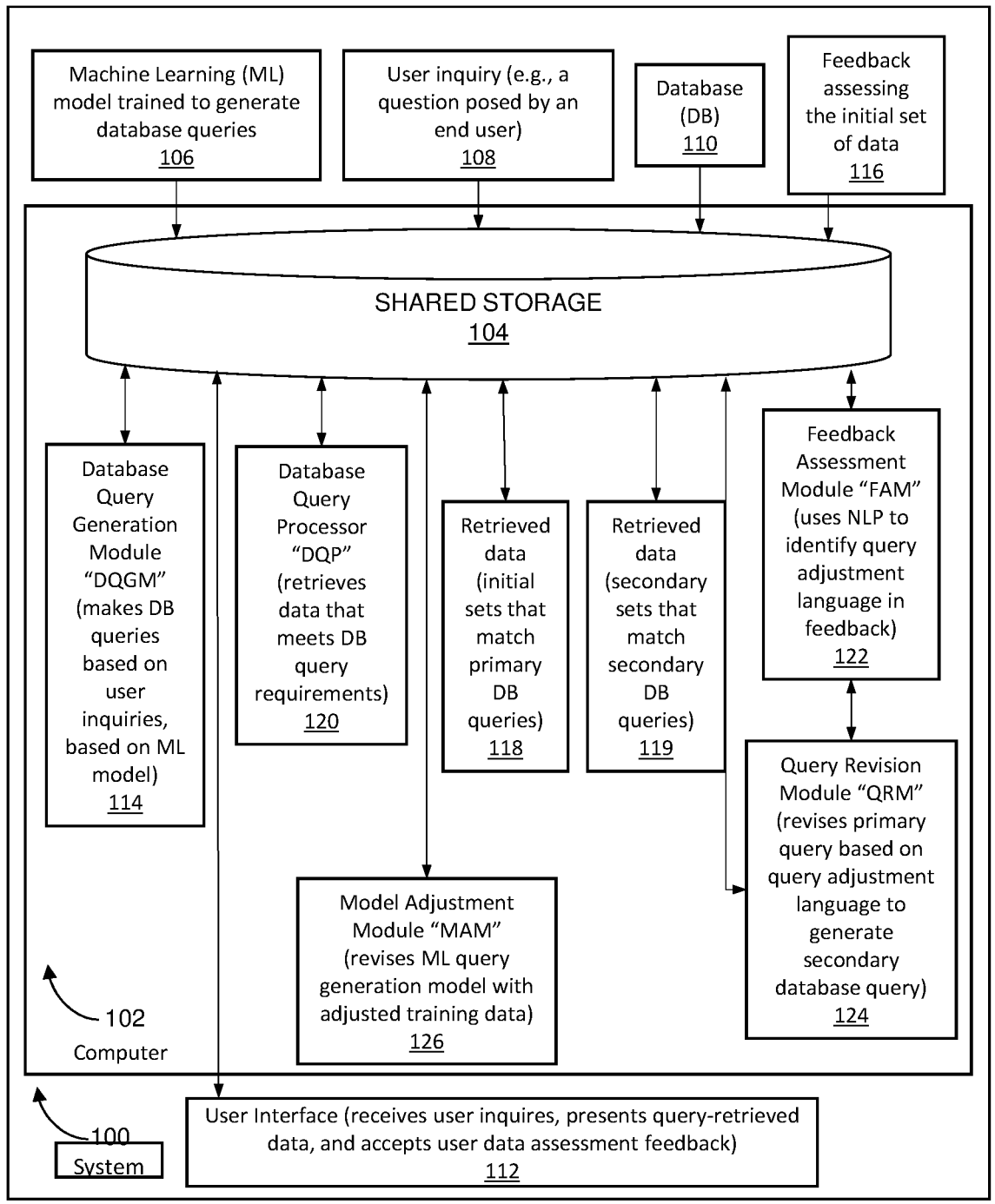
FIG. 1 is a schematic block diagram illustrating an overview of a system for a computer-implemented database chatbot assistant that dynamically responds to user inquiries, adjusting results provided and query-generating models employed, in response to result assessment feedback according to embodiments of the present invention.
Figure 2:
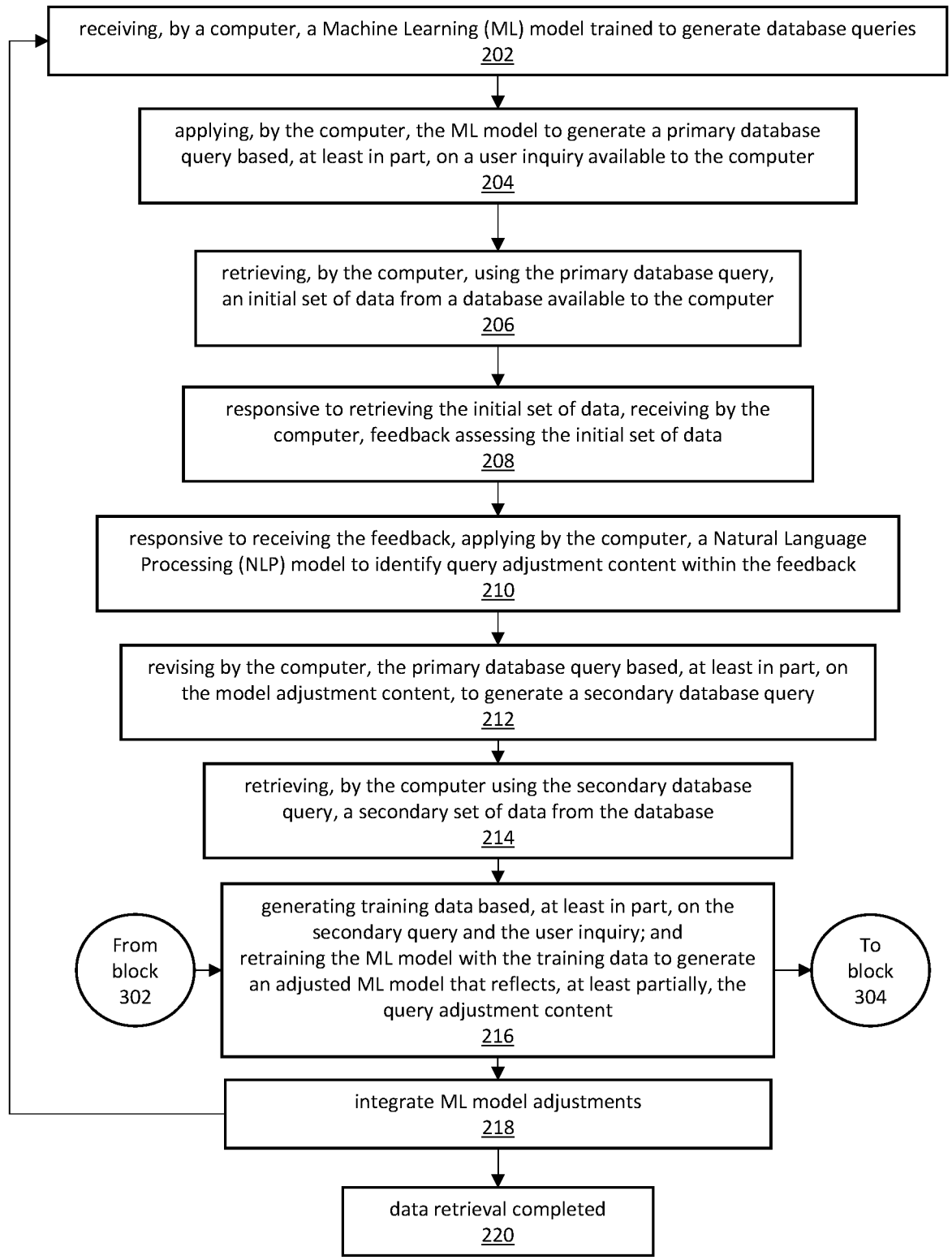
FIG. 2 is a flowchart illustrating a method, implemented using the database chatbot assistant system shown in FIG. 1 that dynamically responds to user inquiries, adjusting results provided and query-generating models employed, in response to result assessment feedback according to aspects of the invention.

Now with combined reference to the Figures generally and with particular reference to FIG. 1 and FIG. 2, an overview of a database chatbot assistant that dynamically responds to user inquiries, adjusting results provided and query-generating models employed, in response to result assessment feedback usable within a system 100 as carried out by a server computer 102 having optionally shared storage 104. The server computer 102 receives a Machine Learning "ML" model 106 (e.g., such as an NLP model) trained to generate database queries that represent user inquiries 108 available to the server computer 102. According to aspects of the invention, the queries are written in Standardized Query Language "SQL" (or other similar data handling language with an established syntax), using predetermined data handling element terms (e.g., target data, filter values and ranges, sort conditions, data grouping criteria, and other elements associated with the query language selected by one skilled in this field).

The server computer 102 is in communication with a source of user inquiries 108. According to aspects of the invention, user inquires 108 (e.g., as shown schematically in table 400 of FIG. 4A) are relevant to data provided in a database 110 or other corpus of information available to the server computer 102. In an embodiment, end users provide inquires 108 in natural language through interaction with a user interface 112 (e.g., a text-based interface, a Graphical User Interface "GUI", or other interface selected by one skilled in this field). It is noted that other sources of user inquiry 108 may also be made available to the server computer 102.

The server computer 102 is in communication with a Database Query Generation Module "DQGM" 114 that generates DB queries suitable to return that answers from the database 110 that match associated user inquiries 108. In an embodiment, the DB queries are based, at least in part, on interpretations of user inquiries 108, and the server computer employs an ML model (e.g., a natural language processing algorithm and corpus adapted to interpret domain-based questions, or a similar arrangement selected by one of skill in this field) to interpret user inquiries 108 and user feedback 116 (e.g., as shown schematically in table 500 of FIG. 5A) assessing data 118,119 retrieved by DB queries (e.g., as respectively shown schematically in table 440 of FIG. 4D and table 530 of FIG. 5D). It is noted that although the sets of retrieved data 118,119 are shown in tabular format, other reporting arrangements may be used.

The server computer 102 includes a Database Query Processor "DQP" 120 that applies queries generated by the DQGM 114 to retrieve sets of data 118,119 from database 110 that meet DB query terms. According to aspects of the invention, the ML model generates primary DB queries which may be adjusted (e.g., changed into a secondary query), in response to user feedback 116 made available to the server computer 102. According to aspects of the invention, secondary queries are modified versions of primary queries updated to accommodate user feedback 116 (e.g., user input that assesses initial results 118 returned by the primary query). It is noted that a user may also provide feedback 116 related to secondary sets of data 119, and the DQGM 114 may iteratively adjust ML models accordingly.

The sever computer 102 includes a Feedback Assessment Module "FAM" 122 that identifies (e.g. such as by using uses NLP processing or other suitable methods selected by one skilled in this field) elements (e.g., such as additional attributes to retrieve 512 and additional filtering criteria 522) of query adjustment language as shown schematically in table 520 of FIG. 5B and table 520 of FIG. 5C) in user feedback 116 available to the server computer. In an embodiment, user feedback 116 is provided by an end user via user interface 112, although feedback may also be provided by other methods known to those skilled in this field.

The sever computer 102 includes Query Revision Module "QRM" 124 that revises primary queries in response to query adjustment language 512, 522 identified in associated user feedback 116 (e.g., to generate secondary queries) to accommodate user proposed modifications.

The server computer 102 includes Model Adjustment Module "MAM" 126 that revises ML query generation models using adjusted training data. According to aspects of the invention, the adjusted training data represents data retrieved using secondary queries (e.g., primary queries adjusted to accommodate user feedback about initially-returned data).

Now with specific reference to FIG. 2, and to other figures generally, a computer-implemented method of retrieving data that dynamically responds to user inquiries, adjusting results provided and query-generating models employed, in response to result assessment feedback with system the system 100 will be discussed.

The server computer 102 receives at block 202 a Machine Learning (ML) model trained to generate database queries from a database 110 (or similar source of information deemed relevant by one of skill in this field to user inquires). In an embodiment, the ML model is a Natural Language Processing algorithm (or similar method selected by one skilled in this field) trained to interpret a user inquiry 108 (e.g., a question written in natural, conversational language) relevant to information contained in the database 110. According to aspects of the invention, the ML model is pre-trained (e.g., by a subject matter expert) to attribute meaning to domain-relevant language in topical inquiries. Aspects of the invention update the ML model to accommodate user feedback, and the updates may be attributed to specific users (e.g., to reflect user preferences) or the ML model generally (e.g., if feedback indicates opportunities to improve accuracy or other areas model performance relevant for all users).

The server computer 102 applies, via Database Query Generation Module "DQGM" 114 at block 204 makes DB queries based on user inquiries, using ML models. In particular the ML model generates a primary database query based, at least in part, on a user inquiry 108 available to the server computer. In an embodiment, the inquiry 108 is provided by an end user via user interface 112. According to aspects of the invention, the DQGM 114 recognizes key terms in the user inquiry and generates a database inquiry in a structured language (e.g., such as SQL or other structured database query language have established query syntax selected by one skilled in this field) to generate a primary query based on the DQGM interpretation of the inquiry. According to aspects of the invention, a primary query will represent information (e.g., initial, model-identified data attributes 412 shown schematically in table 410 of FIG. 4B) and preferred data target values (e.g., initial, model-identified filter criteria 422 shown schematically in table 420 of FIG. 4C) requested by an end user in an associated user inquiry 108.

The server computer 102 retrieves at block 206, via Database Query Processor "DQP" 120 retrieves data that meets DB query requirements. In particular, the DQP 120 uses the primary database query, to return an initial set of data 118 (e.g., as shown schematically within table 430 of FIG. 4D) from a database 110 available to the computer. In an embodiment, the server computer 102 applies a primary DB query (e.g., a query based on ML-based interpretation of a user inquiry 108) to retrieve data that matches attributes 412 and filter values 414 identified by the DGQM 114 from within the database 110. According to aspects of the invention, the primary query is formatted to provide results predicted by the server computer 102 (e.g., have been identified by the DGQM 114) to satisfy the user inquiry 108. According to aspects of the invention, the server computer 102 uses DB queries that represent target data attributes (e.g., such as the model-identified data attributes 412,422 identified within an associated user inquiry 108 and shown schematically in table 402 of FIG. 4B and table 420 of FIG. 4C, respectively) and attributes 510,522 identified within user feedback 116 (e.g., as shown schematically in table 520 of FIG. 5C and table 530 of FIG. 5D, respectively) to retrieve data items matching an associated user inquiry 108 from the database 110 or other source of relevant information available to the server computer. According to aspects of the invention, the server computer 102 presents the results (e.g., initial set of data 118 retrieved by the DQP) is provided to an end user for review and comment or acceptance via user interface 112.

In response to presenting the initial set of data 118 to an end user, the server computer 102 receives at block 208, feedback 116 in which an end user assesses the results of the primary query. In an embodiment, the user feedback 116 includes one or more natural language messages provided through user interaction with user interface 112, after the user has examined the initial set of data provided by the DQP.

According to aspects of the invention, content of user feedback 116 indicates how the recognition results (e.g., the initial set of data 118) could be adjusted, if desired, to meet user preferences. In an embodiment, the user feedback 116 is provided in natural language and indicates adjustments to be made, including request for additional (or different) data attributes 512 (e.g., as shown schematically in table 510 of FIG. 5B) to be provided and desired refinements for filter values 514 (e.g., as shown schematically in table 510 of FIG. 5B) to be satisfied. It is noted that user feedback may also include request for customized sorting (e.g., to follow a preferred listing order) data provided. It is noted that other adjustments may also be requested, and that in some cases, no modifications may be desired.

The server computer 102, identifies in block 210, user desired adjustments for the results provided. In particular, in response to receiving the user feedback 116, the server computer 106 applies via Feedback Assessment Module "FAM" 122, a Natural Language Processing (NLP) model to identify query adjustment content within the feedback 116 (e.g., such as a indications to "Add", "Modify", and "Delete" attributes incorporated into the existing primary query), for downstream transformation of the primary query into a secondary query. It is noted that, according to aspects of the invention, assessment feedback 116 may include some elements that are to be associated with only a selected user (e.g., as identified by a relevant user identifier 402 shown schematically in table 400 of FIG. 4A and table 500 of FIG. 5A) and other elements that are suitable for multiple users (e.g., such as preferences associated with users of a relevant ML model or associated with a particular domain).

According to aspects of the invention, the FAM 122 applies a convolutional neural network "CNN" or other similar methodology selected by one of skill in this field to classify feedback 116. In an embodiment, the FAM 122 applies a binary classification algorithm to broadly determine intent within feedback content. In an embodiment, once intent is attributed to content, the FAM 122 applies a multi-categorical classification algorithm to identify requests containing expected operation types (e.g., add, modify, delete, etc., as appropriate for the structured language associated with modeling techniques applied by the DQGM 114). According to aspects of the invention, the FAM 122 is trained to recognize domain-relevant entities associated with the relevant database 110, and the FAM 122 considers those entities when refining database queries.

In accordance with preferred adjustments 512, 522 identified in user feedback 116, the server computer 102 generates secondary queries based on adjusted versions of the primary queries. In particular, the server computer 102 revises primary queries via Query Revision Module "QRM" 124 at block 212. According to aspects of the invention, the revisions are based, at least in part, on content of the model adjustment feedback 116, and the QRM 124 generates secondary database queries that reflect user-requested query refinements.

The server computer 102, retrieves secondary sets of data 119 in block 214. In particular, the server computer 102, through additional application of the Database Query Processor "DQP" 120, initiates a query of database 110 using the secondary database query to return a secondary set of data 119 from the database. According to aspects of the invention, the initial set of data 118 is updated in real-time into a secondary set of data that reflects user-requested query refinements.

According to aspects of the invention, the secondary query reflects refinements indicated in user feedback 116. However, it is possible that even further modifications may be desired, and additional feedback may be iteratively provided and processed (e.g., with multiple feedback interpretations, query updates, and retrievals of adjusted results) accordingly. Once the retrieved results 119 are accepted, (e.g., when no further assessment feedback is provided, after a predetermined number of model revisions has been generated and applied, or in accordance with another threshold selected by one of skill in this field), active chatbot interaction ends (e.g., is paused, terminated, or is otherwise suspended as appropriate for a given user session).

The server computer 102, at block 216 makes query generation ML model adjustments based on the accepted data results 119 and revises the model with updated training data. In particular, the server computer 102 via Model Adjustment Module "MAM" 126 generates training data based, at least in part, on a selected secondary (e.g., revised primary query) and associated user inquiry. In an embodiment, the MAM retrains the ML model with the training data to generate an adjusted ML model that reflects, at least partially, the primary query after user-desired content adjustments 512, 522 are identified and processed.

Figure 3:
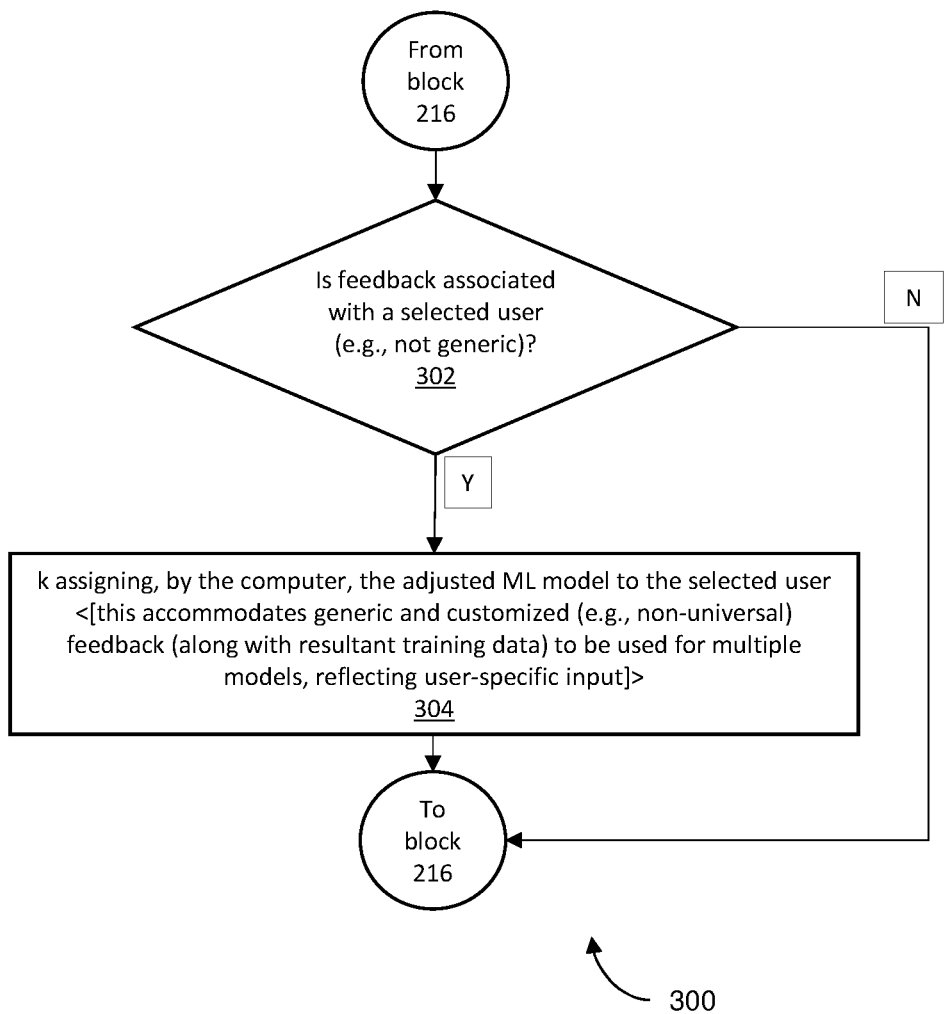
FIG. 3 is a flowchart illustrating aspects of a method, implemented using the database chatbot assistant system shown in FIG. 1 that dynamically responds to user inquiries, adjusting results provided and query-generating models employed, in response to result assessment feedback according to aspects of the invention.

As noted above, some query modifications are associated with a selected user, while other modifications are more universal (e.g., as indicated by user ID 402), and the server computer 102, accommodates this indication. In particular, before integrating ML model adjustments, the server computer 102 considers at block 302 (as seen with reference to FIG. 3), whether feedback provided 116 is user specific (e.g., for example is identified by the user as being a personal preference, received during interaction with a user identified by a user account identifier, or in accordance with other user identification factors selected by one skilled in this field) or generic (e.g., relevant to all users). In an embodiment, if the server computer 102 determines that the feedback is relevant only for selected users, then the server computer assigns, at block 304, the adjusted ML model (e.g., the ML model generated with the user-specific feedback and resultant training data) to the relevant user or groups of users, and processing flow returns to block 216.

The server computer 102 updates, in block 218, the ML model for future use. In particular the server computer 102 integrate ML model adjustments and adopts the updated model as the ML model for later query generation tasks associated, as appropriate, with users identified in blocks 302 and 304.

Data retrieval is completed at block 220, and the server computer 102 is available for future chatbot and user interaction.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
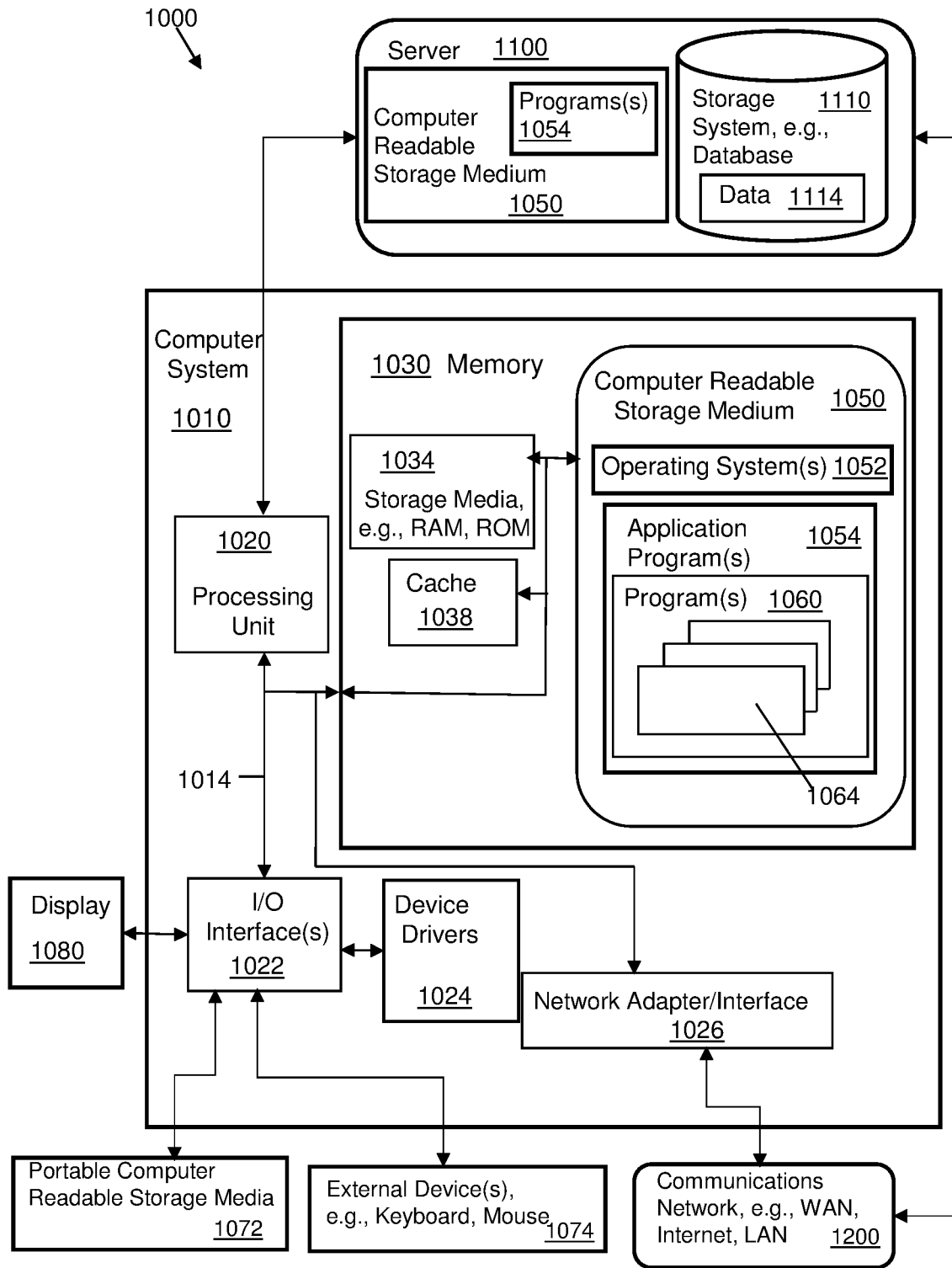
FIG. 6 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 6, a system or computer environment 1000 includes a computer diagram 1010 shown in the form of a generic computing device. The method of the invention, for example, may be embodied in a program 1070, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1070 is executable by the processor 1020 of the computer system 1010 (to execute program steps, code, or program code). Additional data storage may also be embodied as a database 1110 which includes data 1114. The computer system 1010 and the program 1070 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1027, and an input/output (I/O) interface(s) 1022. The I/O interface 1022 allows for input and output of data with an external device 1074 that may be connected to the computer system. The network adapter/interface 1027 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1070 for performing the tasks of each of the steps of the method and system. The modules are generically represented in the figure as program modules 1074. The program 1070 and program modules 1074 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1070 and can be stored in memory 1030 in the computer readable storage medium 1050. The program 1070 can include program modules 1074. The program modules 1074 can generally carry out functions and/or methodologies of embodiments of the invention as described herein. The one or more programs 1070 are stored in memory 1030 and are executable by the processing unit 1020. By way of example, the memory 1030 may store an operating system 1052, one or more application programs 1054, other program modules, and program data on the computer readable storage medium 1050. It is understood that the program 1070, and the operating system 1052 and the application program(s) 1054 stored on the computer readable storage medium 1050 are similarly executable by the processing unit 1020. It is also understood that the application 1054 and program(s) 1070 are shown generically, and can include all of, or be part of, one or more applications and program discussed in the present disclosure, or vice versa, that is, the application 1054 and program 1070 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via a network adapter/interface 1027. As depicted, network adapter 1027 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
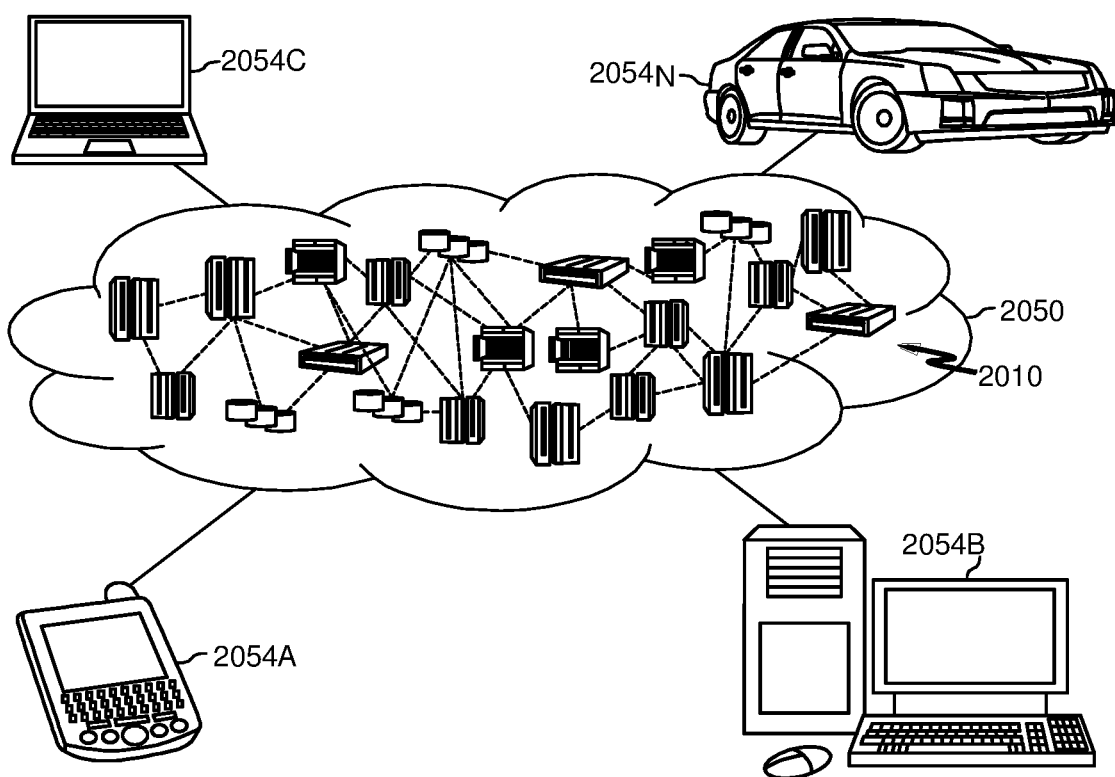
FIG. 7 depicts a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
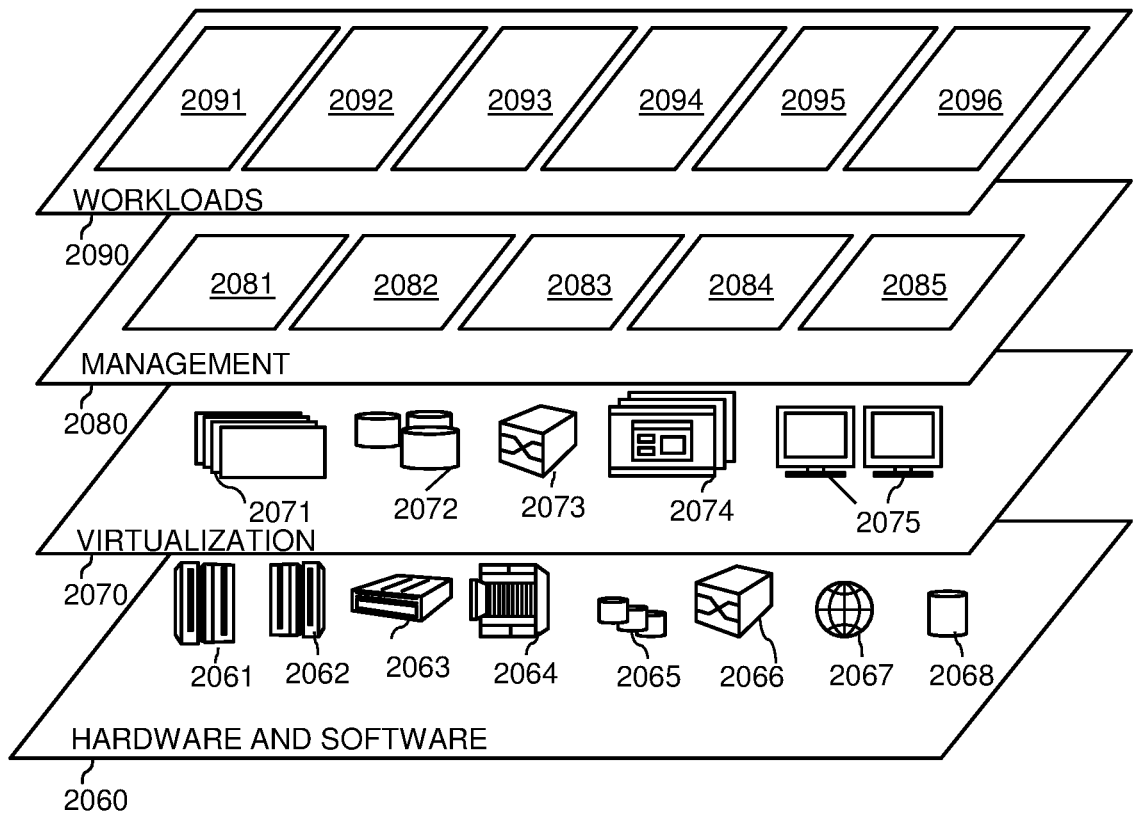
FIG. 8 depicts abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2070 includes hardware and software components. Examples of hardware components include: mainframes 2071; RISC (Reduced Instruction Set Computer) architecture based servers 2072; servers 2073; blade servers 2074; storage devices 2075; and networks and networking components 2077. In some embodiments, software components include network application server software 2077 and database software 2078.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and database chatbot assistants that dynamically respond to user inquiries, adjusting results provided and query-generating models employed, in response to result assessment feedback 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of retrieving data from a database, comprising:
   receiving, by a computer, a Machine Learning (ML) model trained to generate database queries;
   applying, by the computer, the ML model to generate a primary database query based, at least in part, on a user inquiry available to the computer;
   retrieving, by the computer using the primary database query, an initial set of data from a database available to the computer;
   responsive to retrieving the initial set of data, receiving by the computer, feedback assessing the initial set of data;
   responsive to receiving the feedback, applying by the computer, a Natural Language Processing (NLP) model to identify query adjustment content within the feedback;
   identifying indications within the query adjustment content to change attributes incorporated into the primary database query to adjust the ML model to transform the primary database query into a secondary database query;
   changing attributes based on the indications within the query adjustment content;
   adjusting the ML model based on the changed attributes;

revising by the computer, the primary database query based, at least in part, on the adjusted ML model;
generating the secondary database query based on the revised primary database query; and
retrieving, by the computer using the secondary database query, a secondary set of data from the database.

2. The method of claim 1, further including:
generating by the computer, training data based, at least in part, on the secondary query and the user inquiry; and
retraining the ML model with the training data to generate an adjusted ML model that reflects, at least partially, the query adjustment content.

3. The method of claim 1, further including:
recognizing that at least a portion of the feedback is associated with a selected user, and
assigning, by the computer, the adjusted ML model to the selected user.

4. The method of claim 1, wherein the model adjustment content includes at least one database query language expression.

5. The method of claim 1, wherein the model adjustment content is identified, at least in part, by a binary intent classification algorithm.

6. The method of claim 1, wherein the model adjustment content is identified, at least in part, by a multi category classification algorithm.

7. The method of claim 1, wherein the model adjustment content is identified, at least in part, by an entity extraction algorithm.

8. A system of retrieving data from a database, which comprises:
a computer system comprising a computer readable storage medium having program instructions embodied therewith, the program instructions executable by a computer to cause the computer to:
receive a Machine Learning (ML) model trained to generate database queries;
apply the ML model to generate a primary database query based, at least in part, on a user inquiry available to the computer;
retrieve using the primary database query, an initial set of data from a database available to the computer;
responsive to retrieving the initial set of data, receive feedback assessing the initial set of data;
responsive to receiving the feedback, apply a Natural Language Processing (NLP) model to identify query adjustment content within the feedback;
identify indications within the query adjustment content to change attributes incorporated into the primary database query to adjust the ML model to transform the primary database query into a secondary database query;
change attributes based on the indications within the query adjustment content;
adjust the ML model based on the changed attributes;
revise the primary database query based, at least in part, on the adjusted ML model;
generate the secondary database query based on the revised primary database query; and
retrieve using the secondary database query, a secondary set of data from the database.

9. The system of claim 8, further including instructions that cause the computer to:
generate training data based, at least in part, on the secondary query and the user inquiry; and
retraining the ML model with the training data to generate an adjusted ML model that reflects, at least partially, the query adjustment content.

10. The system of claim 8, further including instructions that cause the computer to:
recognize that at least a portion of the feedback is associated with a selected user, and
assign the adjusted ML model to the selected user.

11. The system of claim 8, wherein the model adjustment content includes at least one database query language expression.

12. The system of claim 8, wherein the model adjustment content is identified, at least in part, by a binary intent classification algorithm.

13. The system of claim 8, wherein the model adjustment content is identified, at least in part, by a multi category classification algorithm.

14. The system of claim 8, wherein the model adjustment content is identified, at least in part, by an entity extraction algorithm.

15. A computer program product to retrieve data from a database, the computer program product comprising a computer readable storage medium having program instructions embodied therewith, the program instructions executable by a computer to cause the computer to:
receive, using a computer, a Machine Learning (ML) model trained to generate database queries;
apply, using the computer, the ML model to generate a primary database query based, at least in part, on a user inquiry available to the computer;
retrieve, using the computer, using the primary database query, an initial set of data from a database available to the computer;
responsive, using the computer, to retrieving the initial set of data, receive feedback assessing the initial set of data;
responsive, using the computer, to receiving the feedback, apply a Natural Language Processing (NLP) model to identify query adjustment content within the feedback;
identify indications within the query adjustment content to change attributes incorporated into the primary database query to adjust the ML model to transform the primary database query into a secondary database query;
change attributes based on the indications within the query adjustment content;
adjust the ML model based on the changed attributes;
revise, using the computer, the primary database query based, at least in part, on the adjusted ML model;
generate the secondary database query based on the revised primary database query; and
retrieve, using the computer, using the secondary database query, a secondary set of data from the database.

16. The computer program product of claim 15, further including instructions that cause the computer to:
generate, using the computer, training data based, at least in part, on the secondary query and the user inquiry; and
retraining, using the computer, the ML model with the training data to generate an adjusted ML model that reflects, at least partially, the query adjustment content.

17. The computer program product of claim 15, further including instructions that cause the computer to:
recognize, using the computer, that at least a portion of the feedback is associated with a selected user, and
assign, using the computer, the adjusted ML model to the selected user.

18. The computer program product of claim 15, wherein the model adjustment content includes at least one database query language expression.

19. The computer program product of claim 15, wherein the model adjustment content is identified, at least in part, by a binary intent classification algorithm.

20. The computer program product of claim 15, wherein the model adjustment content is identified, at least in part, by a multi category classification algorithm.

* * * * *